(12) United States Patent
Asou et al.

(10) Patent No.: US 8,027,322 B2
(45) Date of Patent: Sep. 27, 2011

(54) COMMUNICATION METHOD, COMMUNICATION SYSTEM, MOBILE NODE AND NETWORK NODE FOR NOTIFICATION ABOUT THE PROXIMITY OF A SECOND WIRELESS NETWORK VIA A FIRST WIRELESS NETWORK

(75) Inventors: Keigo Asou, Kanagawa (JP); Jun Hirano, Kanagawa (JP); Tien Ming Benjamin Koh, Singapore (SG); Chan Wah Ng, Singapore (SG); Pek Yew Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 653 days.

(21) Appl. No.: 12/281,135

(22) PCT Filed: Mar. 1, 2007

(86) PCT No.: PCT/JP2007/054496
§ 371 (c)(1),
(2), (4) Date: Aug. 28, 2008

(87) PCT Pub. No.: WO2007/102565
PCT Pub. Date: Sep. 13, 2007

(65) Prior Publication Data
US 2009/0010237 A1    Jan. 8, 2009

(30) Foreign Application Priority Data
Mar. 2, 2006    (JP) .................................. 2006-057002

(51) Int. Cl.
*H04W 4/00*    (2009.01)

(52) U.S. Cl. ........................................................ 370/338
(58) Field of Classification Search .......... 370/328–350, 370/400, 401; 455/456.1, 456.2, 456.6, 432.1
See application file for complete search history.

(56) References Cited

U.S. PATENT DOCUMENTS

| 2003/0118015 | A1 | 6/2003 | Gunnarsson |
|---|---|---|---|
| 2004/0023669 | A1 | 2/2004 | Reddy |
| 2005/0064844 | A1 | 3/2005 | McAvoy |
| 2005/0079877 | A1 | 4/2005 | Ichimura |
| 2005/0083893 | A1 | 4/2005 | Purkayastha |
| 2005/0113117 | A1 | 5/2005 | Bolin |
| 2005/0162314 | A1 | 7/2005 | Bromley |

FOREIGN PATENT DOCUMENTS

GB    2 389 005    11/2003

OTHER PUBLICATIONS

International Search Report dated Jul. 13, 2007.

*Primary Examiner* — Chi Pham
*Assistant Examiner* — Alexander Boakye
(74) *Attorney, Agent, or Firm* — Dickinson Wright PLLC

(57) ABSTRACT

This system provides for communications between several different types of wireless networks and a mobile node. The system provides various services from a wireless network to a mobile node which is not covered by that wireless network without exhaustion of the mobile node battery. According to this system, the mobile node sends an update message to a currently accessible network node, which transfers the update message to the same or different types of nearby network nodes with incrementing the hop count for every transfer. The different type of network node that has received the update message checks whether the hop count decreases from that previously received, judges that the mobile node is approaching if the hop count decreases, and sends the guide message to the mobile node via the same and different types of networks.

10 Claims, 11 Drawing Sheets

FIG. 2

| MT ID | COUNT | SN | CURRENT NETWORK TYPE | DESIRED NETWORK TYPE | AVAILABLE NETWORK TYPE |
|---|---|---|---|---|---|
| 201 | 202 | 203 | 204 | 205 | 206 |

FIG. 3

| PoA ID | MT ID | INFORMATION |
|---|---|---|
| 301 | 302 | 303 |

FIG. 11

| NODE | DISTANCE (CURRENT/PREVIOUS) | DIFFERENCE | SEND INVITE MESSAGE? |
|---|---|---|---|
| BS1 | 1 / 0 | +1 | - |
| BS2 | 0 / 1 | -1 | - |
| AP1 | 2 / 1 | +1 | NO |
| AP2 | 1 / 2 | -1 | YES |
| AP3 | 1 / 2 | -1 | YES |

COMMUNICATION METHOD, COMMUNICATION SYSTEM, MOBILE NODE AND NETWORK NODE FOR NOTIFICATION ABOUT THE PROXIMITY OF A SECOND WIRELESS NETWORK VIA A FIRST WIRELESS NETWORK

TECHNICAL FIELD

The present invention relates to the field of telecommunications with the packet switched data communications network. More particularly, it relates to the position and mobility updates for a wireless mobile node and the operation of the network upon receipt of the updates. The present invention also relates to a communication method and a communication system for performing communications between heterogeneous wireless networks and mobile nodes. The present invention further relates to a mobile node and a network node in the communication system.

BACKGROUND ART

Recently, the mobile computing including access to the Internet during moving of the mobile node has been more and more popular. The mobility is achieved by the fact that the network connection is available even when the mobile node moves. Multimode terminals that can connect to the Internet using a wide range of access technologies such as the third generation (3G) or other cellular networks, General Packet Radio Service (GPRS), IEEE 802.11a/b/g, IEEE 802.16a or Bluetooth® are also becoming popular than before.

Among various portable computers with high networking capabilities such as cellular phones, laptops and PDAs (Personal Digital Assistants), for example, the request for seamless communications with both of wired and wireless networks is increasing. In addition, as the use of multimedia contents increases in video conferences or the like, seamless communications are more considered as the essential and required feature of the mobile connections. In the practical management of the mobility, it is necessary to provide a seamless handoff so that the users do not notice any disruption of communication. The mobile data networks today commonly consist of a plurality of overlapping wireless networks supporting different data rates and geographical areas and can be accessed only via wireless interfaces peculiar to the applicable media.

Every time a mobile node changes the cell, subnet or network, coverage responsibilities need to be switched between the access nodes providing the service. To provide seamless roaming among these networks, it is necessary to make communications among the networks in order to request the reservation of resources for the mobile node. Thus, in case a user in public transportation facilities is accessing the Internet, for example, complicated problems increase as the transfer speed of the mobile node becomes higher. In addition, it becomes more difficult to learn the transfer direction of the mobile node for reservation of the resources with presumption.

On the other hand, learning the position and the intended mobility of the mobile node brings commercial profits in providing services based on the local area along the intended transfer route. For example, a tourist may get some indication about the scenery or attraction as he moves along a street, and the information may be dynamically updated and refreshed as he turns a corner.

Therefore, the recent wireless system faces a problem that the mobile terminal always needs to scan for alternative access network different from the one currently in connection, which requires too much cost for cellular terminals. Still other problems are that special devices and high calculation capabilities are required for dynamic positioning information and that a solution to search for access networks out of the range is lacking.

As a conventional method to solve the above-mentioned problems, it is proposed in the patent document 1 to use a mobile user tracking system and a positioning system. This solution utilizes tracking of the cellular call information history provided by the user terminal. In the patent document 1, however, there is a problem that the positioning system of cellular phones does not have a sufficient accuracy.

As other conventional methods to solve the above-mentioned problems, it is proposed in the patent documents 2 and 5 to use GPS receivers on the terminal or network side in addition to the tracking history in order to improve the forecast accuracy of the user position information. In the patent documents 2 and 5, however, the GPS receiver is indispensable and the forecast based on the history information is correct only when the motion of the terminal is along as any known route such as bus or train route.

As still another conventional method to solve the above-mentioned problems, it is proposed in the patent document 3 that the terminal makes communications with both networks in dual mode and permits access to the service from either network in that process. In the patent document 3, however, there is no description about the terminal position and the fact that it is out of the networks is not informed.

Furthermore, as still another conventional method to solve the above-mentioned problems, it is proposed in the patent document 4 to provide another device that sends virtual wireless base station ID data from a certain position in the wireless system. This may improve the accuracy of mobile terminal position forecast with a modest investment. According to the patent document 4, however, this method works only when several repeaters are in a small area (a building, for example. Still in this case, another device is required on the network side.).

[Patent document 1] [US Patent Application US 20050064844 A1] Derek McAvoy, Oleg Lebedko and Igor Shushakov, "Mobile User Location Tracking System", US Patent Application 20050064844 A1, 17 Sep. 2004.

[Patent document 2] [US Patent Application US 20050079877 A1] Atsushi Ichimura, "Mobile Object Location Providing Device and Mobile Object Location Providing System", US Patent Application 20050079877 A1, 19 Aug. 2004.

[Patent document 3] [US Patent Application US 20050083893 A1] Debashish Purkayastha and Kamel M. Shaheen, "Method and Apparatus for Reporting WLAN Capabilities of a Dual Mode GPRS/WLAN or UMTS/WLAN WTRU", US Patent Application 20050083893 A1, 31 Dec. 2003.

[Patent document 4] [US Patent Application US 20050113117 A1] Johan Bolin, Rune Johansson and Ari Kangas, "Position Determination of Mobile Stations", US Patent Application 20050113117 A1, 5 Dec. 2003.

[Patent document 5] [US Patent Application US 20050162314 A1] Patrick G. Bromley, Louis H. M. Jandrell and Michael D. Wise, "Method and System for Processing Positioning Signals Based on Predetermined Message Data Segment", US Patent Application 20050162314 A1, 17 Mar. 2005.

The problem to be solved by the present invention is explained below, with reference to FIG. 12. FIG. 12 shows the service areas provided by wireless base stations BS1 and BS2 and the service areas provided by access points AP1, AP2 and AP3 as circles. Among BS's and AP's shown in FIG. 12, any pair of BS's or AP's or a set of BS and AP may be on the same link as layer 2 in the OSI reference model or may be on the same network as layer 3.

Mobile node MN has interfaces (IFs) for communications with both of the networks provided by the wireless base stations BS1 and BS2 and the networks provided by the access points AP1, AP2 and AP3. Here, the service areas of the wireless base stations BS1 and BS2 are adjacent to enable seamless communications. The service areas of the access points AP1, AP2 and AP3 are, however, smaller than the service areas of the wireless base stations BS1 and BS2 and some of them are separated (AP1 and AP2/AP3) and some are adjacent (AP2 and AP3).

Suppose, in such a system, the mobile node MN moves from the service area of the wireless base station BS1 to that of the wireless base station BS2 during communications with the networks of the wireless base stations BS1 and BS2 and scans the access points AP1, AP2 and AP3 to search for a network different from those of the wireless base stations BS1 and BS2. This scanning needs to be continued with both interfaces always kept active, which exhausts the battery. On the other hand, even if the provider of the position base service on the network side of the access points AP1, AP2 and AP3 knows that the mobile node MN is approaching and desires to provide services, it cannot provide any service because the mobile node MN is out of the areas of the access points AP2 and AP3 in FIG. 12.

DISCLOSURE OF THE INVENTION

It is an object of the present invention to solve or at least substantially improve the above-mentioned problems and shortcomings of the prior art. In particular, it is an object of the present invention to provide a means to efficiently and effectively convey the position, moving and desired information about a node to the network. It is another object to provide a means for nodes in the network to make a response in order to use the functions and services related to the position and moving.

It is still another object of the present invention, in particular, to provide a communication method, a communication system, a mobile node and a network node that can provide various services from wireless networks to a mobile node not covered by them without exhausting the battery of the mobile node when several different wireless networks have communications with the mobile node.

To attain the foregoing objects, the present invention provides a method for performing communication between a mobile node comprising means for communicating with at least first and second different wireless networks and each of network nodes of the first and second wireless networks, the method comprising the steps of:

sending a first message wishing communication with a network node of the second wireless network which is currently inaccessible, from the mobile node to a network node of the first wireless network currently accessible by the mobile node;

sending the first message with added distance information about a distance from the network node receiving the first message to the network node of the second wireless network, from the network node receiving the first message to nearby network nodes of the first and second wireless networks;

the network node of the second wireless network receiving the first message with the added distance information checking whether the distance information decreases from that of the first message previously received, and if it is judged that the mobile node is approaching when the distance information decreases, sending a second message guiding communication with its network to nearby network nodes;

transferring the second message from the network node receiving the second message to the network node of the first wireless network-accessible by the mobile node;

transferring the second message from the network node of the first wireless network receiving the second message to the mobile node; and presenting the second message to a user from the mobile node receiving the second message.

The present invention is characterized by that the distance information is a hop count which is incremented every time a nearby network node of the first and second wireless networks that transfers the first message makes a transfer and, the network node of the second wireless network receiving the first message checks whether the hop count decreases from that of the first message previously received and judges that the mobile node is approaching if the distance information decreases.

In addition, to attain the foregoing objects, the present invention provides a communication system for performing communication between a mobile node comprising means communicate with at least first and second different wireless networks and each of the network nodes of the first and second wireless networks, the system comprising:

means for sending a first message wishing communication with a network node of the second wireless network which is currently inaccessible from the mobile node to a network node of the first wireless network currently accessible by the mobile node;

means for sending the first message with added distance information about a distance from the network node receiving the first message to the network node of the second wireless network, from the network node receiving the first message to a nearby network node of the first and second wireless networks;

means for, by the network node of the second wireless network receiving the first message with the added distance information, checking whether the distance information decreases from that of the first message previously received, and if it is judged that the mobile node is approaching when the distance information decreases, sending a second message guiding communication with its network to nearby network nodes;

means for transferring the second message from the network node receiving the second message to the network node of the first wireless network accessible by the mobile node;

means for transferring the second message from the network node of the first wireless network receiving the second message to the mobile node; and means for presenting the second message to a user from the mobile node receiving the second message presents.

In addition, to attain the foregoing objects, the present invention provides a mobile node in a communication system for performing communication between a mobile node comprising means for communicating with at least first and second different wireless networks and each of network nodes of the first and the second wireless networks, the mobile node comprising:

means for sending a first message wishing communication with a network node of the second wireless network currently inaccessible to a network node of the first wireless network currently accessible; and means for receiving a second message and presenting it to a user, in case a first message with added distance information about a distance from the network node receiving the first message to the network node of the second wireless network is sent from the network node receiving the first message to nearby network nodes of the first and second wireless networks, the network node of the second wireless network receiving the first message with the added distance information checks whether the distance information decreases from that of the first message previously received, and if it is judged that the mobile node is approaching when the distance information decreases, sends a second message guiding communication with its network to nearby network nodes, corresponding to said second message, and the second message is transferred from the network node receiving the second message to the network node of the first wireless network accessible by the mobile node, and the second message is transferred from the network node of the first wireless network receiving the second message to the mobile node.

In addition, to attain the foregoing objects, the present invention provides a network node in a communication system for performing communication between a mobile node comprising means for communicating with at least first and second different wireless networks and each of network nodes of the first and second wireless networks, the firstly mentioned network node belonging to the first wireless network currently accessible by the mobile node and comprising:

means for receiving a first message and sending the first message with added distance information about a distance from the network node receiving the first message to nearby network nodes of the first and second wireless networks, in case a first message wishing communication with a network node of the second wireless network currently inaccessible, corresponding to the first message, is sent from the mobile node to a network node of the first wireless network currently accessible by the mobile node;

means for receiving a second message, and for transferring it to the network node of the first wireless network accessible by the mobile node, in case the network node of the second wireless network receiving the first message with the added distance information checks whether the distance information decreases from that of the first message previously received, and if it is judged that the mobile node is approaching when the distance information decreases, sends a second message guiding communication with its network to nearby network nodes, corresponding to said second message; and means for receiving the second message and transferring it to the mobile node;

wherein the mobile node receiving the second message presents the second message to the user.

In addition, to attain the foregoing objects, the present invention provides a network node in a system for performing communication between a mobile node comprising means for communicating with at least first and second different wireless networks and each of network nodes of the first and second wireless networks, the firstly mentioned network node belonging to the second wireless network that is currently inaccessible and comprising means for receiving a first message with added distance information, checking whether the distance information decreases from that of the first message previously received, and if it is judged that the mobile node is approaching when the distance information decreases, sending a second message guiding the communication with its network to nearby network nodes, in case a first message wishing communication with a network node of the second wireless network that is currently inaccessible, corresponding to said first message, is sent from the mobile node to a network node of the first wireless network currently accessible by the mobile node, and the first message with added distance information about a distance from the network node receiving the first message to nearby network nodes of the first and second wireless networks, corresponding to said first message with the added distance information, is sent from the network node receiving the first message to nearby network nodes of the first and second wireless networks;

wherein the second message is transferred from the network node receiving the second message to the mobile node, and the mobile node receiving the second message presents the second message to a user.

With this configuration, a wireless network can provide various services to a mobile node that is not covered by that network without exhaustion of the mobile node battery.

According to the present invention, when communications are made between a plurality of different wireless networks and a mobile node, a wireless network can provide various services to the mobile node that is not covered by that network without exhaustion of the mobile node battery.

BRIEF DESCRIPTION OF THE DRAWINGS

FIG. 2 is an explanatory view illustrating the information elements required for an update message to notify the position information, moving information and related information about the mobile node over adjacent networks in FIG. 1;

FIG. 3 is an explanatory view illustrating the information elements required for a guide message sent by a network node in response to the update message sent by the mobile node as shown in FIG. 2;

FIG. 11 is an explanatory view illustrating the internal status of the network node shown in FIG. 1.

BEST MODE FOR CARRYING OUT THE INVENTION

Figure 1:
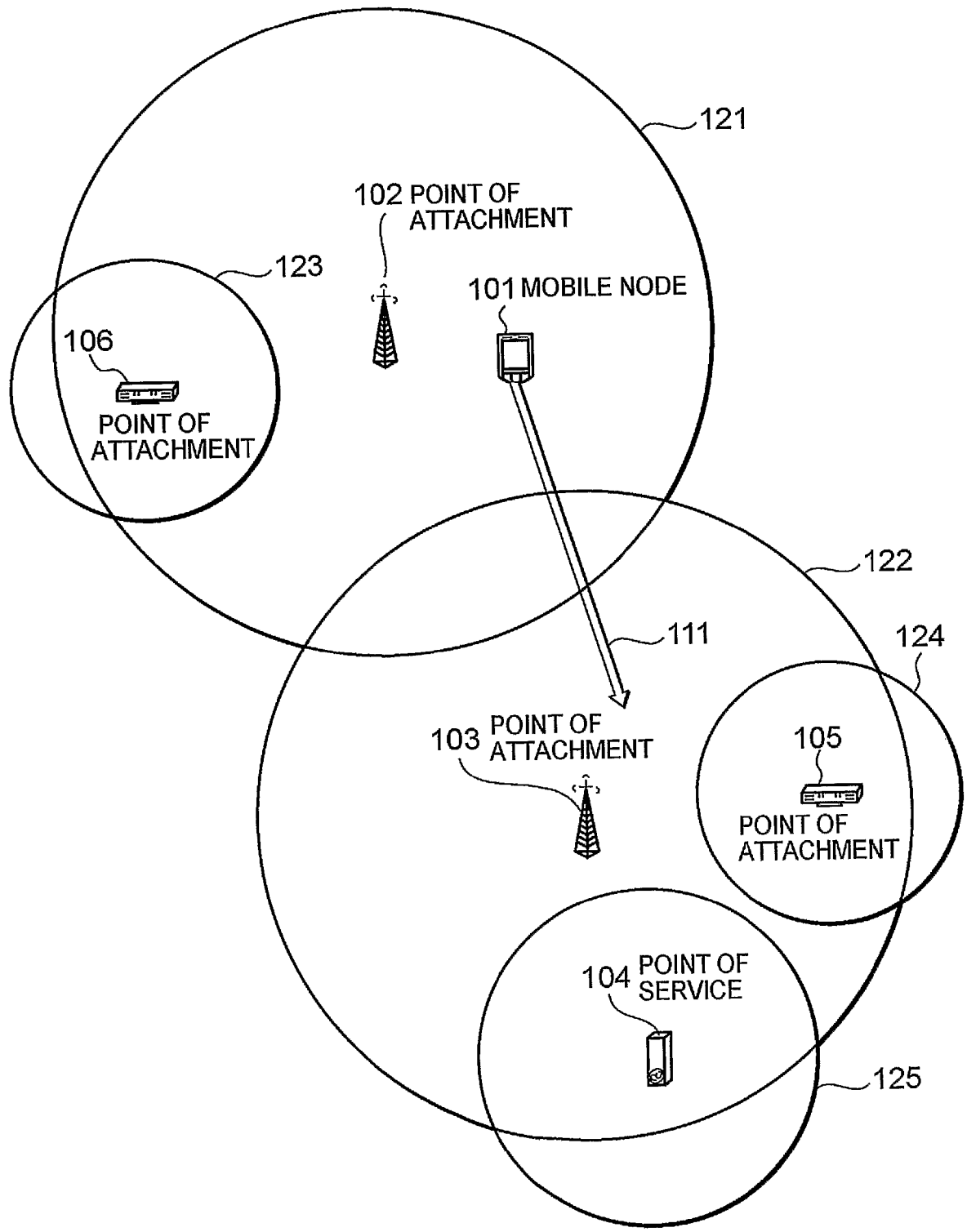
FIG. 1 is an explanatory view of the network according to a preferred embodiment of the present invention illustrating the status where a mobile node is roaming over a plurality of networks.

Referring to the accompanying drawings, embodiments of the present invention will be explained below. FIG. 1 shows an example in which a mobile node 101 moves across the neighborhood with a plurality of overlapping network areas. In this example, points of attachment (PoA) 102 and 103 of WAN (Wide Area Network) and Points of Attachment (PoA) 105 and 106 of WLAN (Wireless LAN) are found as network nodes. Circles 121, 122, 123, 124 and 125 show the ranges covered by PoAs 102, 103 106 and 105 as well as a point of service (PoS) 104 respectively. Though the ranges covered by PoA 102, 103, 106 and 105 as well as PoS 104 are shown as circles 121, 122, 123, 124 and 125 and PoA 102, 103, 106, and 105 as well as PoS 104 are respectively positioned at the center of the circles 121, 122, 123, 124 and 125 in FIG. 1, it is naturally understood by those skilled in the art that the covered ranges may have any shapes.

PoS 104 can provide various forms of services such as video contents or interactive contents to the mobile node 101. To improve the user's experience about the convenience and usefulness for the user, it is desirable for the network nodes nearby to know that the mobile node 101 is in the proximity. The network nodes may provide location-based service such as positional information about the attractions and hot spots nearby or may inform existence of alternative types of networks to be accessed to the mobile node 101.

In order to have the network nodes work effectively by notifying the position information and moving information of the mobile node 101 to the network nodes around it, the present invention proposes to use some optional fields added as the updated messages propagated by the network nodes to be put into the dedicated message packets or the existing message frames exchanged among network nodes. The update message fields may be added as an extended header to the existing IP (Internet Protocol) message or may be transmitted as a protocol message of a lower layer such as IEEE802.11 or IEEE802.16 control message, for example. The message may be started from the mobile node 101 or from the network node 401 (see FIG. 4) with which the mobile node 101 is associated or connected.

FIG. 2 shows an example of additional fields constituting the update message. The field of MT ID 201 is used for identification of the mobile node 101 this message refers to. An example of MT ID would be a MAC (Media Access Control) identifier of the mobile node 101, a value of a terminal according to IEEE802 standards, which is guaranteed to be unique among all IEEE 802 nodes. It should be noted that an ID of any form, such as SIM (Subscriber Identity Module) ID, for example, can be used. Even a host name created by the user can be used as far as it serves for identification of the mobile node 101 by the network node.

The count 202 represents a metric to describe how far the mobile node 101 is currently located from the start point of the update message. This may simply be an integer that either counts up or counts down. If the metric of the count 202 is assumed to start from a positive integer here, it is decremented as the update message gets propagated further. The absolute value of the metric of the count 202 may depend on the mounting status of the system. The count 202 may be the absolute distance from a known point or any number as the starting point. In addition, the value showing the distance between PoAs may be a physical or logical value arbitrarily determined by the operator. For example, a value based on the physical distance or a hop count which increases and decreases every time a PoA is passed may be used. As the distance between two PoAs, a value predetermined according to the respective types of PoAs may be used.

The motion characteristics of the mobile node 101 with reference to a network node 401 can be assumed based on the metric of the count 202. Note that continuous increment of the count 202 may suggest that the mobile node 101 is approaching and is becoming closer to the network node 401 or, on the contrary, decrement may suggest approaching of the mobile mode 101. In addition, the change rate of the count 202 provides a hint for the moving speed of the mobile node 101. What is more important is that it indicates whether the mobile node 101 is moving closer to or further from the network node 401.

When the difference between the previously recorded count 202 and the currently received count 202 is calculated, the newly calculated difference Count_Diff is obtained. A positive Count_Diff may mean that the mobile node 101 is moving toward the network node 401 and, on the other hand, a negative Count_Diff may mean that the mobile node 101 is going further from the network node 401. In case the difference Count_Diff is 0, it may mean that the mobile node 101 is moving in the direction orthogonal to the position of the network node 401 or the mobile node 101 remains in the range of the same network node 401.

SN203 is a sequence number to help detection of duplication. For example, it may be an integer which increments every time the mobile node 101 sends an update message and restarts the increment from the minimum value after it reaches the maximum value, or it may be a time stamp corresponding to the mounting status. The length of the sequence number is selected and determined based on various factors. A longer sequence number is less vulnerable to errors and the mobile node 101 has less opportunity to use an inappropriate sequence when it restarts. However, the advantage of a short sequence number requiring only a small memory space resulting in reduce overhead of the message size should be taken into consideration when determining the length. As an option, it is possible that SN203 is stored to a non-volatile memory of the mobile node 101 and is kept for restart.

The field of "Current network type" 204 is for an optional parameter and contains the information related to the network the mobile node 101 is currently subscribed to or using. This value may be the name of the service operator currently used by the mobile node 101 or may be the type of the network interface. The network node 401 may use the information of 204 to determine whether to guide the mobile node 101 to use its services. In an example of scenario using this system, an entrepreneur related to the service provider described in the "current network type" 204 may "guide" the user of the mobile node 101 by advertising location-based services. In another example, the network node 401 belonging to a different access network type may advertise its availability to the mobile node 101. In addition, this information of 204 may be used by network operators. Network operators may receive this message and use it to optimize their services by, for example, improving the load balance or similar algorithms.

"Desired network type" 205 is another optional field. The type of the network the mobile node 101 is interested in is described here. This information of 205 may be some information from a preferred service operator and may be the type of the access network or the type of video or entertainment service, for example. Similarly, the network node 401 may use this information of 205 to provide and advertise the service position information and available information to the mobile node 101.

"Available network type" 206 is another optional field. The type of the network that can be supported by the mobile node 101 is described here regardless of the preference of the mobile node 101. In an example of such system, the nodes of the cellular, WLAN and Bluetooth® networks that can be supported by the mobile node 101 may advertise to the mobile node 101 that their networks are available. Network operators may use this information of 206 to optimize their own networks and transfer the mobile node 101 to another network. Another example of such system, the network types supported by the mobile node 101 may be listed in this field. Thus, it is advertised that the mobile node 101 can support video and interactive games and service providers nearby can immediately guide the mobile node 101 to use their services.

FIG. 3 shows a guide message sent from the network node 401 to the mobile node 101. The field of PoA ID 301 is used for identification of the network node which has created the guide message. This field may contain the network node identifier. For example, this field may have the access point ID (AP ID) for WLAN Points of Attachment (PoAs 105 and 106 in FIG. 1).

The field of MT ID 302 is used for identification of the mobile node 101 related to this update message. MT ID 302 is the same as that described in the update message shown in FIG. 2. For example, this field may have a value of the terminal according to IEEE802 standards serving as the MAC identifier of the mobile node 101.

The field of information 303 is variable and contains the information that the network node 401 desires the mobile node 101 to receive. The information 303 may include, but may not be limited to the type of the access network provided by the network node (WLAN, for example), the service type (interactive video or VoIP (Voice over IP), for example), the positional information of the network node and any secret or non-secret information that is not understood by the mobile node 101. For example, the information may include the instruction for the mobile node 101 in the overlapping area to execute the handover from one PoA to another PoA. With referring to FIG. 1, when the mobile node 101 is in the overlapping area of the service area 121 and the service area 122 and is accessing the PoA 102, a guide message can be sent to instruct the mobile node 101 to execute the handover to the PoA 103. Thus, the mobile node 101 can, even while it is accessing a PoA providing a certain service area, do preparation (authentication, context transfer and so on) for or execute the handover to a different PoA providing another service area. In addition, this message for handover instruction may be sent by the PoA providing the service area where the mobile node 101 is not located. In this case, the mobile node 101 can forecast that it will possibly execute the handover to another service area existing nearby and can grasp the characteristics of that PoA in advance and do preparation (authentication, context transfer and so on) for the handover to that PoA.

Figure 4:
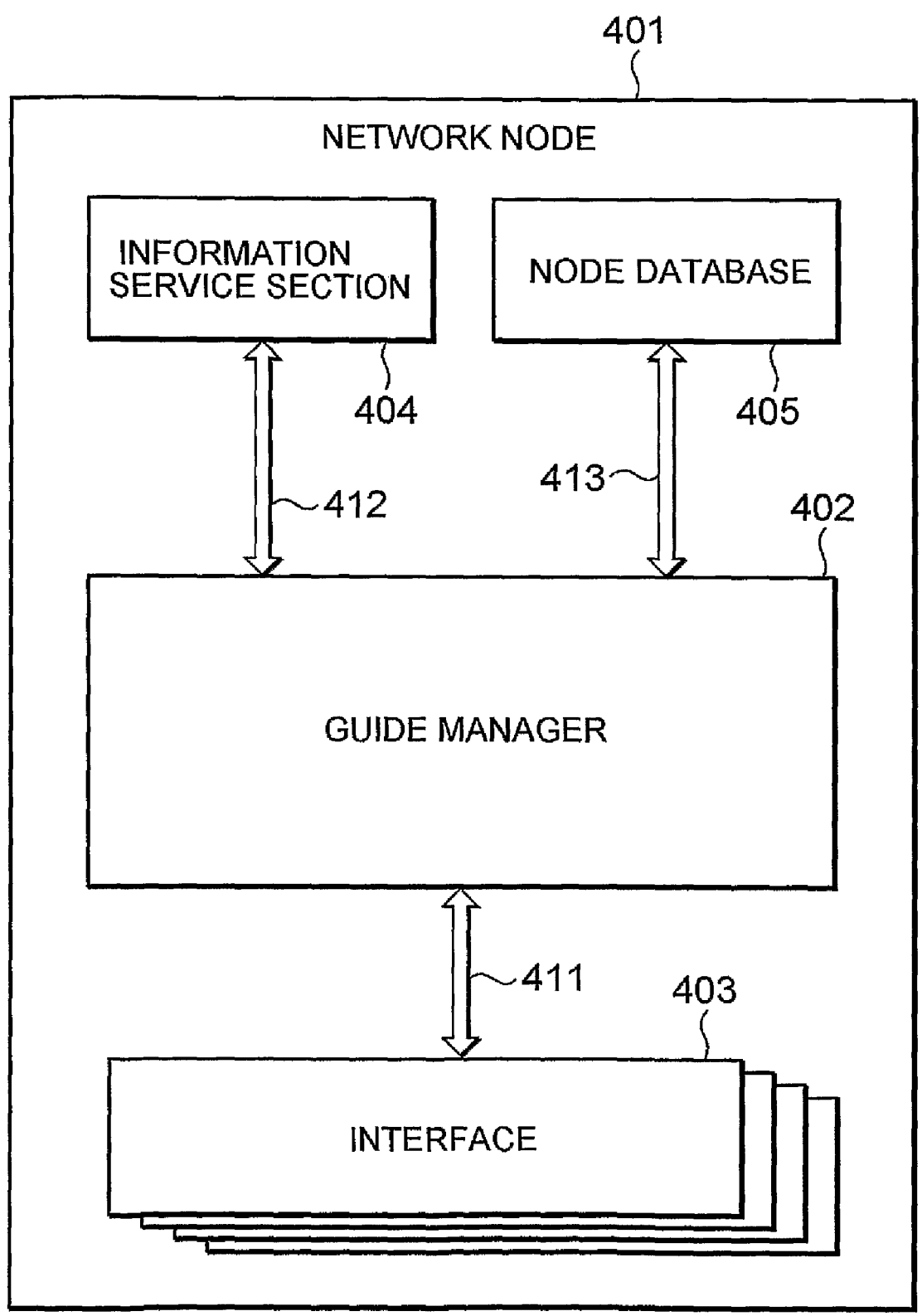
FIG. 4 is a functional configuration view of the network node shown in FIG. 1 for implementation of the guide message in FIG. 3 in order to efficiently and effectively response to the mobile node.

FIG. 4 shows the components required in the network node 401 to implement the present invention. The network node 401 may be any node realizing the present invention. The applicable nodes include, but are not limited to the Points of Attachment (PoAs 105 and 106 in FIG. 1) of the wireless. LAN, the base stations and the routers, for example. A guide manager 402 representatively handles the update message sent directly from the mobile node 101 or via another network node in the network node 401. The update message is received by any of a plurality of interfaces 403 and is sent to the guide manager 402 via a message path 411.

According to another embodiment of the present invention, the guide manager 402 may be located somewhere in the network providing a plurality of network nodes at the same time. In this case, the guide manager 402 may be located in a physically single network node or may be physically independent from any network node. Here, in case the guide manager 402 is disposed physically independently from the network node 401, the paths 411, 412 and 413 for connection between the guide manager 402 and an interface 403, an information service section 404 and a node database 405 may be physical wires or may be virtual wires using network connection (TCP connection, for example).

Figure 5:
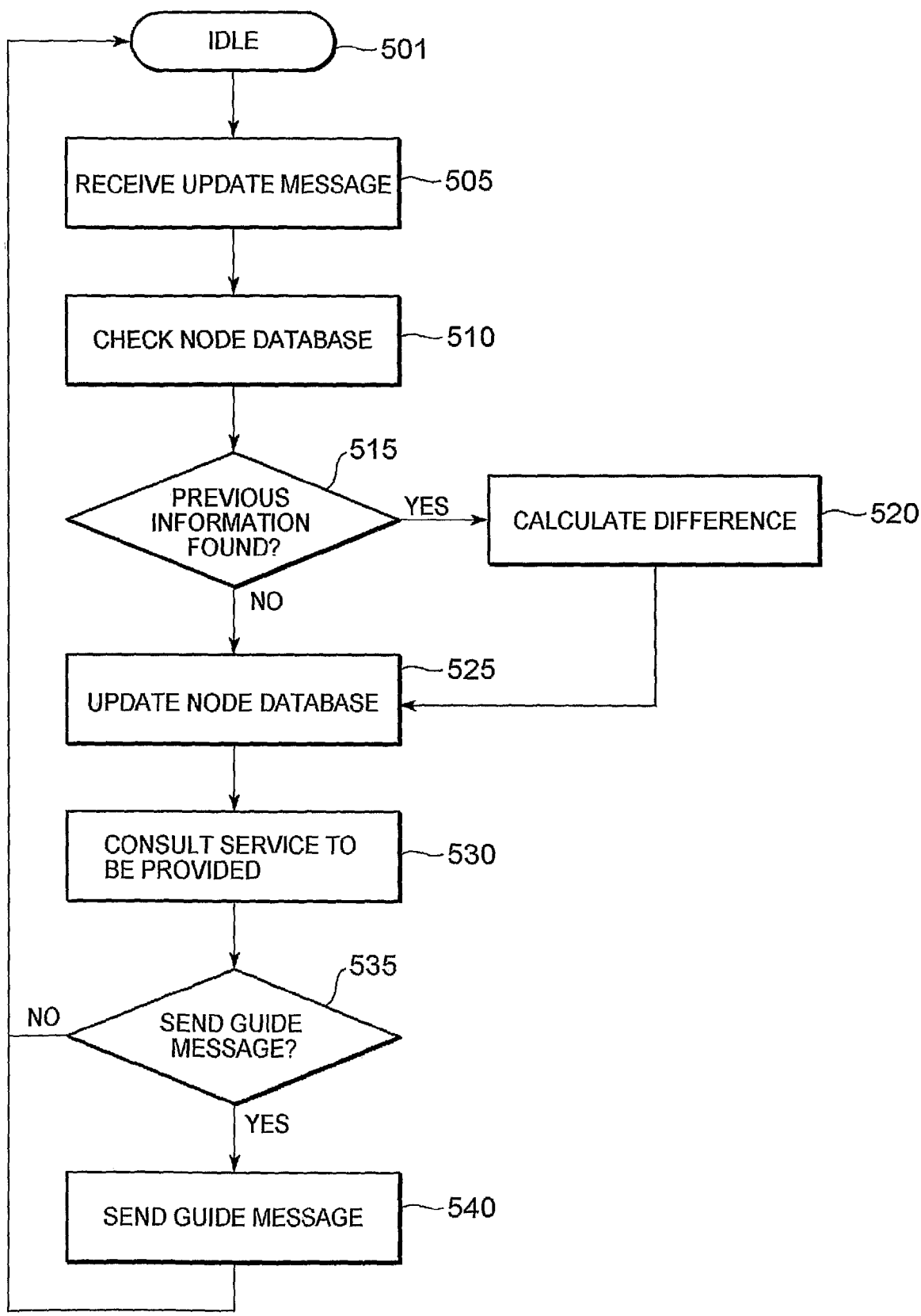
FIG. 5 is a flowchart illustrating the operation of the network node.

FIG. 5 shows a flowchart illustrating the typical operation according to the present invention. The network node 401 starts from the idle status at step 501. When it receives an update message containing the fields shown in FIG. 2 (step 505), the guide manger 402 firstly consults the node database 405 whether it has any record about the mobile node 101 (steps 510 and 515). This processing is executed via the message path 413 shown in FIG. 4. Here, the node database 405 may be wholly or partially placed elsewhere in the network and may keep other data. In practice, the node database 405 can keep global information about the mobile node 101. For example, while the dynamic information about the mobile node 101 is kept locally on the network node 401, the node database 405 may also contain the information kept on a global server.

When the first update message is received from the mobile node 101, or the guide manager 402 does not find any previous information on the node database 405 at step 515, the guide manager 402 updates the node database 405 with the received information (step 525) and then consults the information service section 404 via the message path 412 about the policy to be implemented (step 530). As in the case of the node database 405, the information service section 404 may contain the policy and the instruction contents for the network node 401, and may be wholly or partially disposed on an external server corresponding to the embodied system. In an example of an embodied system, the information service section 404 may instruct the guide manager 402 not to send the guide message as shown in FIG. 3 if the mobile node 101 is not within the threshold distance.

When the update message related to the mobile node 101 is received in future by the network node 401, the answer at step 515 is "YES". Then, the guide manager 402 picks up the previous information stored in the node database 405 and calculates the difference Count_Diff about the mobile node 101 (step 520). When the guide manager 402 has the newest information about the mobile node 101 at step 525, it makes another inquiry to the information service section 404 (step 530). Next, the guide manager 402 decides whether or not to send the guide message based on the factors such as whether the difference Count_Diff is positive or negative, the absolute value of the difference Count_Diff, the value of the count 202 and the current network type 204 (if any), the desired network type 205 and the available network type 206 (step 535). If it sends the guide message, it executes the sending at step 540.

The operation example of the present invention is described below with using a system example shown in FIG. 1. In the figure, the mobile node 101 moves only from the service range 121 of the PoA 102 of WAN and only to the service range 122 of the PoA 103 of the same WAN (path 111 in the figure). It does not move to the service ranges 124, 123 or 125 of the PoAs 105 and 106 and the PoS 104 of WLAN. Suppose here that it is desired to send a guide message from WLAN to the mobile node 101.

Figure 6:
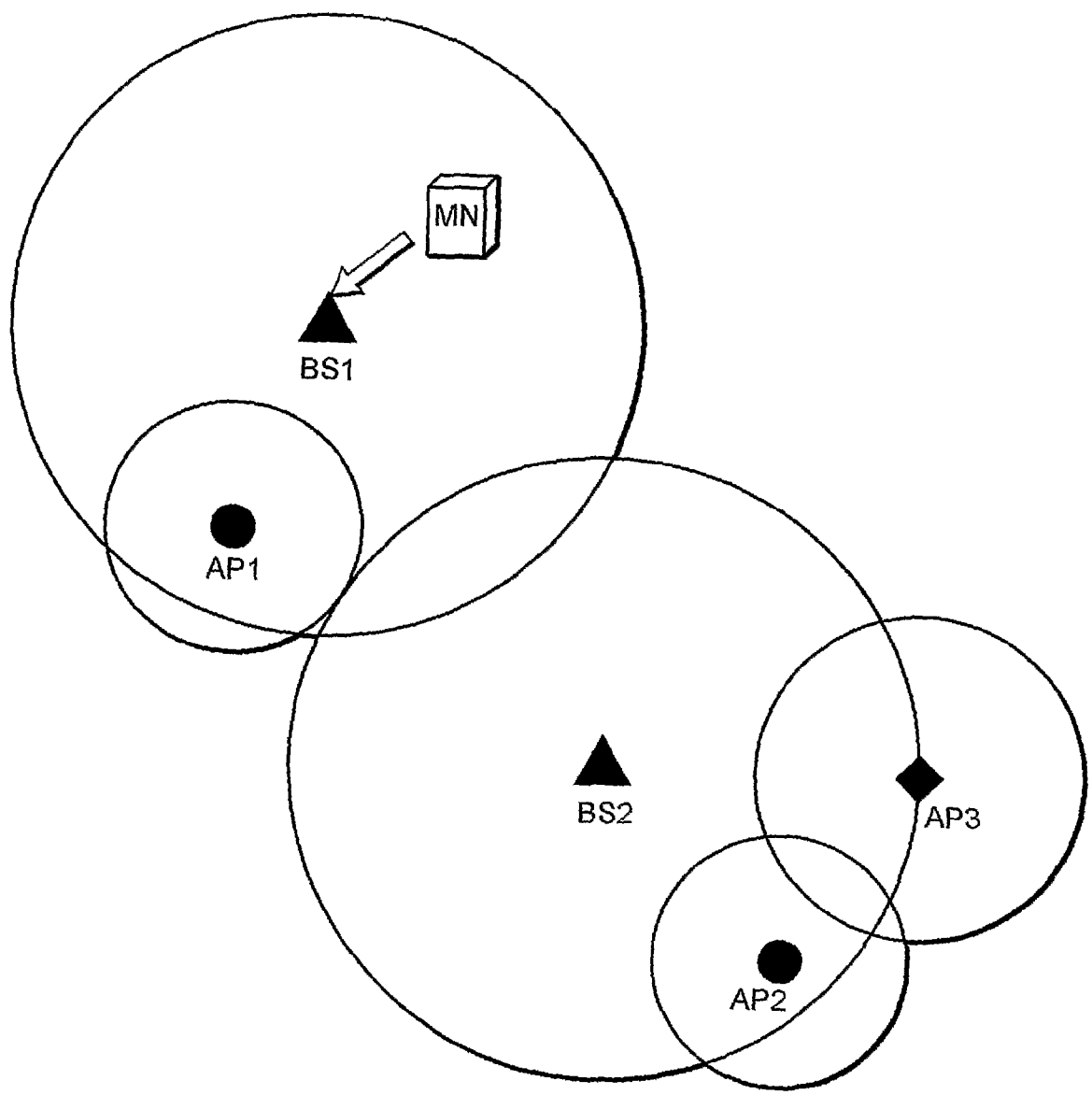
FIG. 6 is a sequence explanatory view of the present invention illustrating a sequence where the mobile node sends the update message to the base station.
Figure 7:
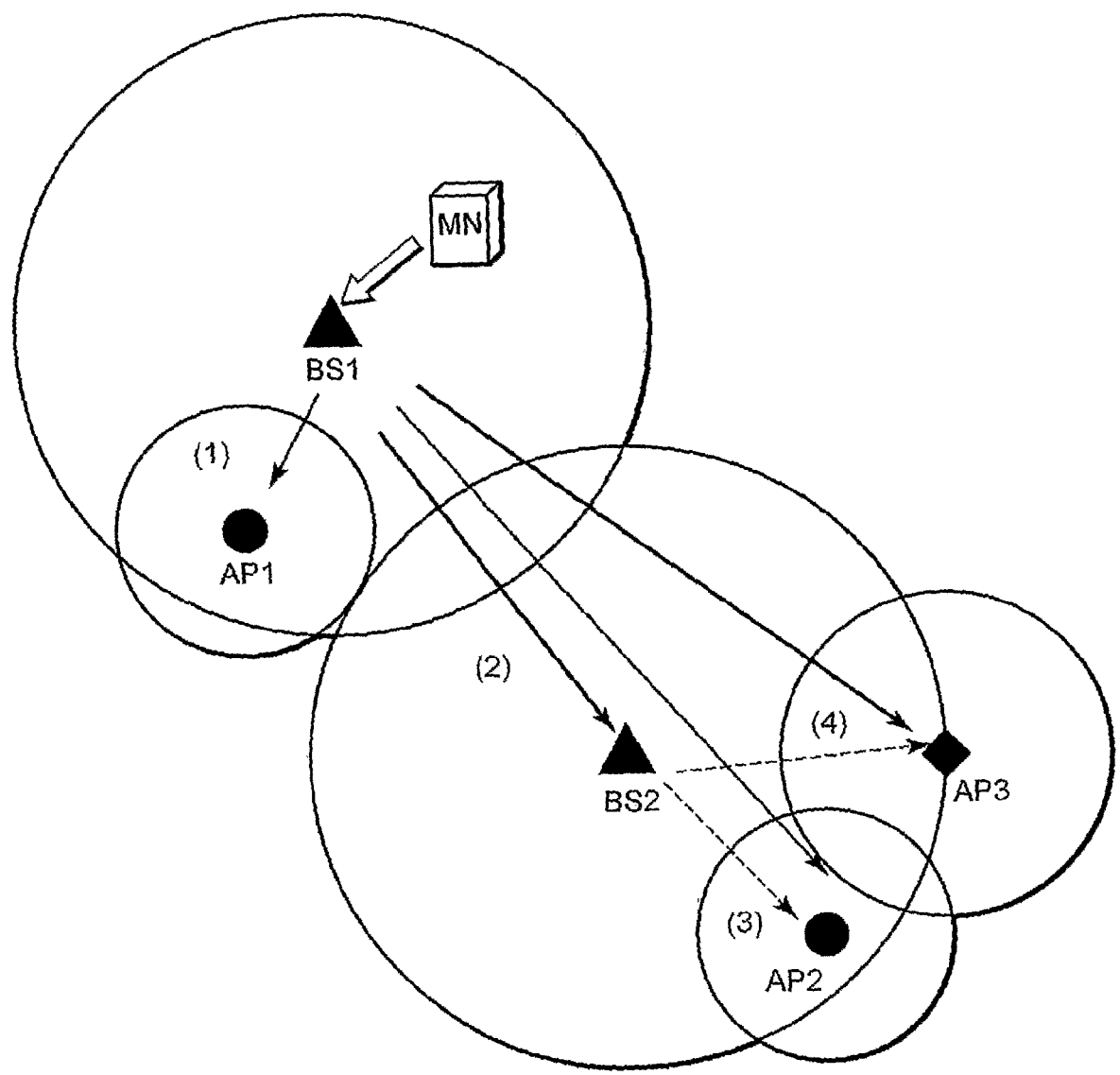
FIG. 7 is a sequence explanatory view of the present invention illustrating a sequence where the base station propagates the update message to nearby network nodes.

Referring to FIGS. 6 to 10, the communication sequence is explained together below. Here, mobile node MN, base stations BS1 and BS2, access points AP1, AP2 and AP3 in FIGS. 6 to 10 refer to the mobile node 101, PoAs 102 and 103 of WAN and PoAs 105 and 106 and PoS 104 of WLAN shown in FIG. 1. First of all, the mobile node MN accesses the base station BS1 and sends the update message to the base station BS1 as shown in FIG. 6. Then, as shown in FIG. 7, the base station BS1 propagates the received update message to the nearby base station BS2 and different types of nearby access points AP1, AP2 and AP3. At that time, the base station BS1 as the sender adds the distances to the destinations (the base station BS2 and the access points AP1, AP2 and AP3) to the update message (Count 202 in FIG. 2) and the base station BS2 and the access points AP1, AP2 and AP3 update the node database 405 with the received information.

If it is not convenient in practice to use the distance itself from the base station BS1 as the sender to the base station BS2 and the access points AP1, AP2 and AP3 as the destination for the count 202, the hop count is used instead. In this case, the hop count of the update message sent by the mobile node MN is considered to be 0. The hop count increments by one at the hopped nodes BS1, BS2, AP1, AP2 and AP3. Therefore, the hop count would be as follows for the transfer from the base station BS1:
(1) Transfer to the access point AP1: Hop count=1
(2) Transfer to the base station BS2: Hop count=1
(3) Transfer to the access point AP2 via the base station BS2: Hop count=2
(4) Transfer to the access-point AP3 via the base station BS2: Hop count=2

Figure 8:
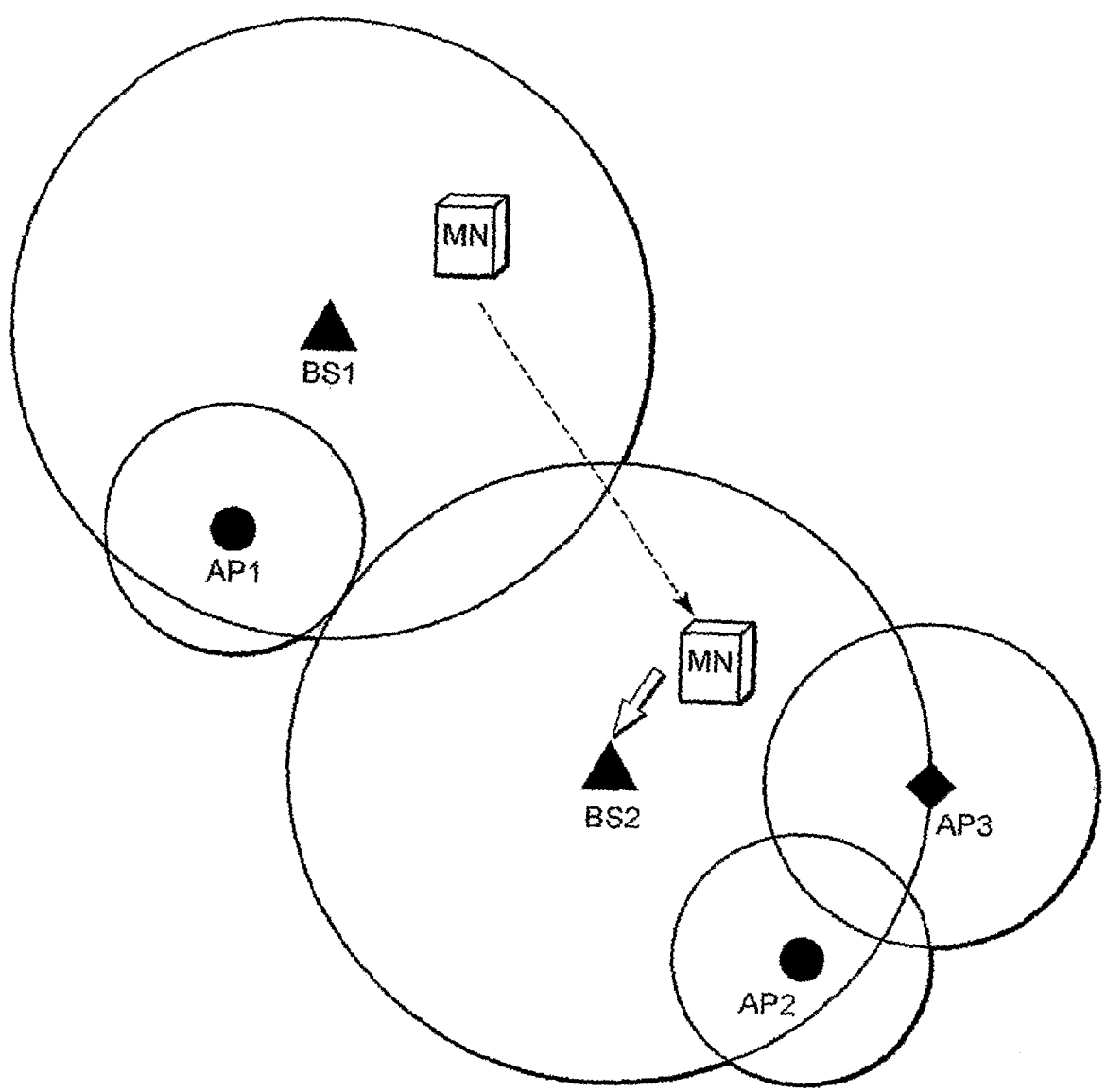
FIG. 8 is a sequence explanatory view of the present invention illustrating a sequence where the mobile node sends the update message to the base station of the destination area.
Figure 9:
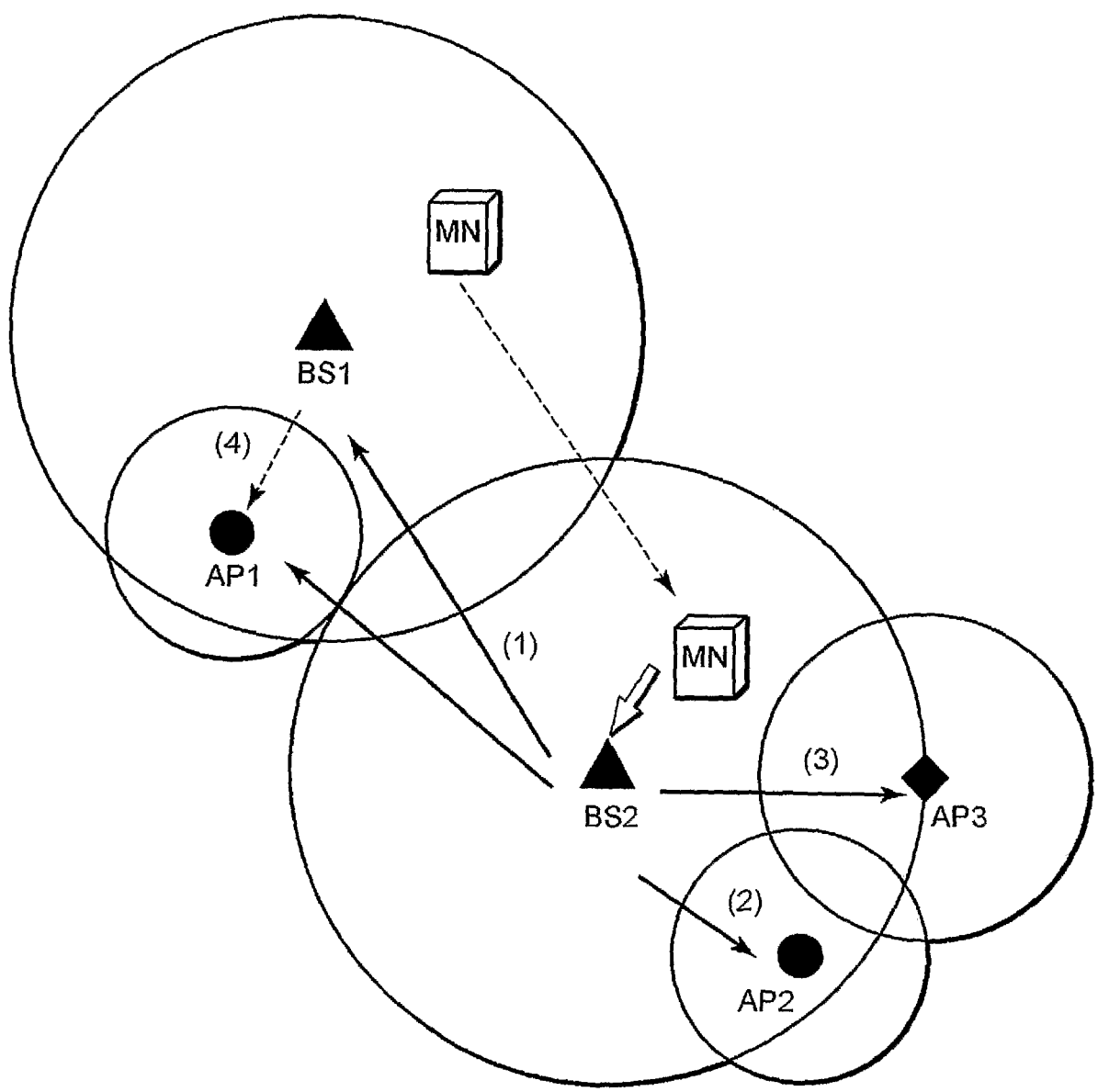
FIG. 9 is a sequence explanatory view of the present invention illustrating a sequence where the base station of the destination area propagates the update message to nearby network nodes.

As shown in FIG. 8, when the mobile node MN leaves the coverage of the base station BS1 and is registered to the destination base station BS2 in the same WAN, it sends the update message to the destination base station BS2. Then, as shown in FIG. 9, the destination base station BS2 similarly propagates the received update message to the base station BS1 and the access points AP1, AP2 and AP3 nearby. At that time, the base station BS2 adds the to the destinations (the base station BS1 and the access points AP1, AP2 and AP3) to the update message and the base station BS2 and the access points AP1, AP2 and AP3 update the node database 405 using the received information.

If the hop count is used as the count 202 here, the update message would be as follows for the transfer from the base station BS2:
(1) Transfer to the base station BS1: Hop count=1
(2) Transfer to the access point AP2: Hop count=1
(3) Transfer to the access point AP3: Hop count=1
(4) Transfer to the access point AP1 via the base station BS1: Hop count=2

Figure 10:
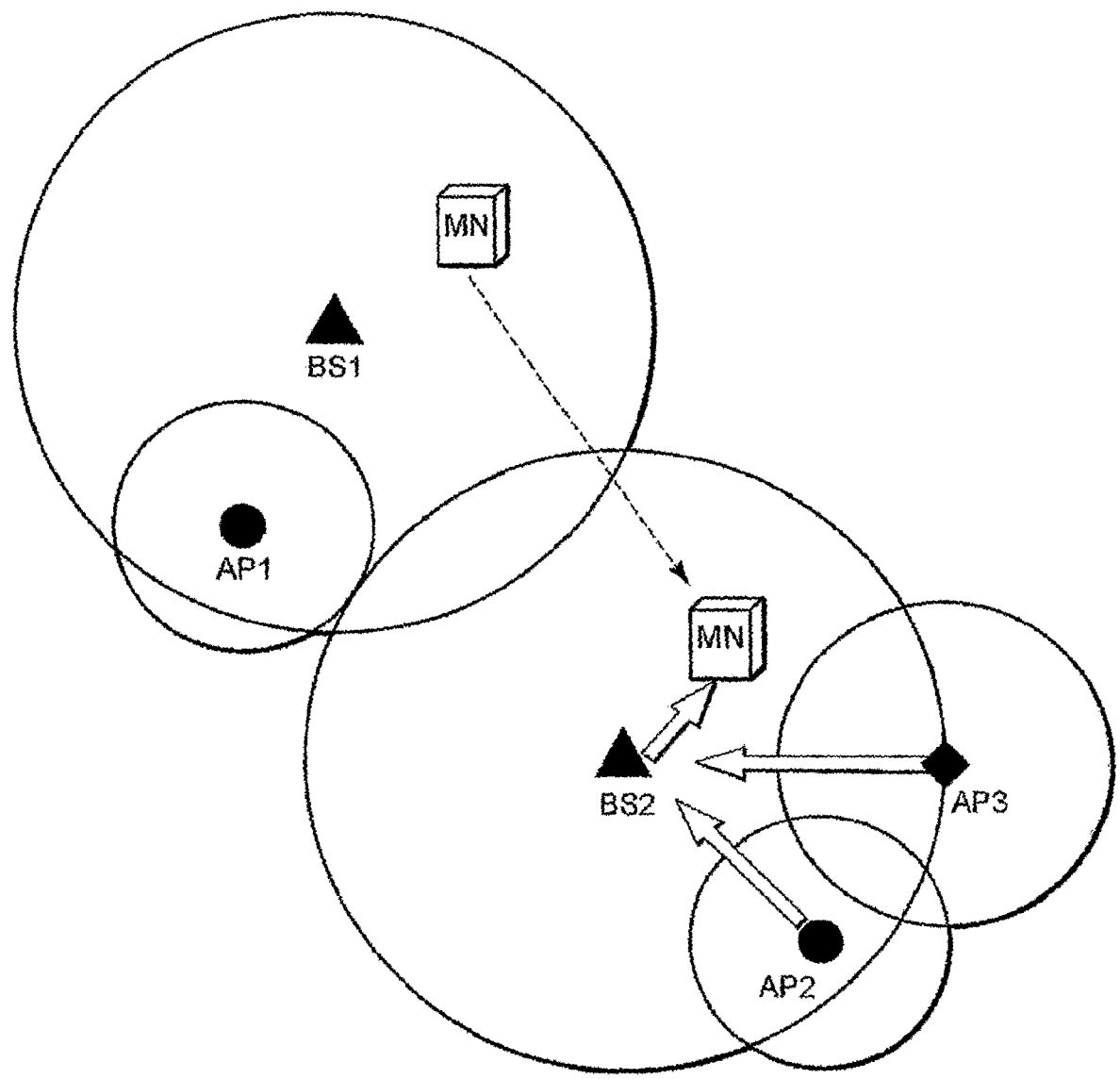
FIG. 10 is a sequence explanatory view of the present invention illustrating a sequence where nearby network nodes send the guide message to the mobile node via the base station of the destination area.
Figure 12:
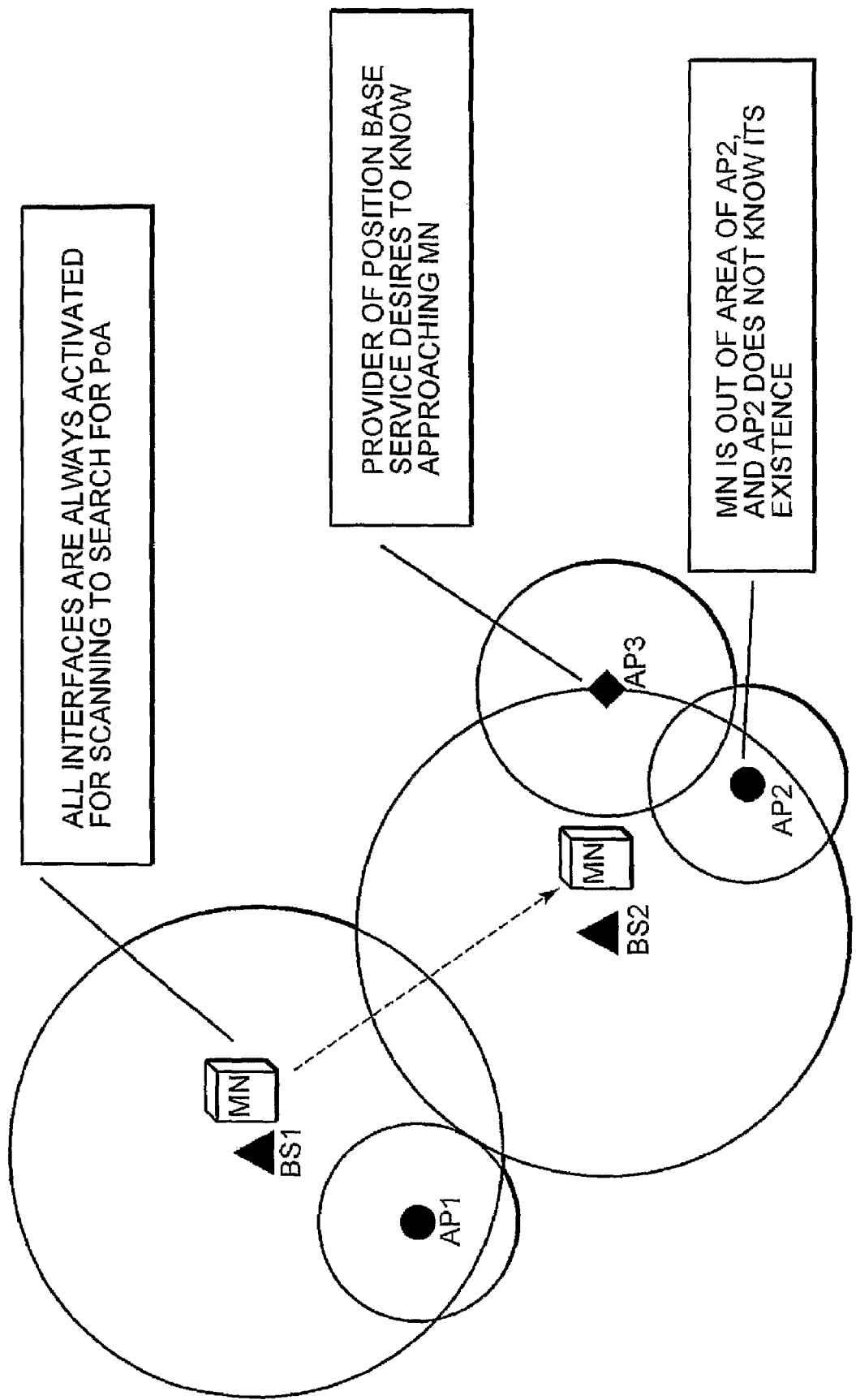
FIG. 12 is an explanatory view illustrating the problems to be solved by the present invention.

Next, the access points AP1, AP2 and AP3 calculate the difference of the hop count serving as the count 202 to determine whether to send the guide message. In this example where the mobile node MN is going away from the access point AP1 and approaching to the access points AP2 and AP3, the access points AP2 and AP3 determine to send the guide message and sends the message via the base station BS2 nearby to the mobile node MN as shown in FIG. 10. Referring to FIG. 11, this operation is explained in further details below. In the above-mentioned case, the difference of the hop count serving as the count 202 is positive at the access point AP1 (Hop count increases) and it is determined "not to send the guide message". At the access points AP2 and AP3, the difference is negative (Hop count decreases) and it is determined "to send the guide message". Note that the base stations BS1 and BS2 are originally set so that "the guide message is not sent" as described above and the message is not sent by them regardless of the count 202.

If the base stations BS1 and BS2 are set so that they "send the guide message" here, the guide message is not sent by BS1 because the hop count is positive there, and it is not sent by the base station BS2, either, because this station is the PoA that is currently accessed by MN. It should be noted here that the sending of the guide message may be selected by a logical PoA if any such PoA exists at the same physical position as the base station BS2.

According to another embodiment of the present invention, the network node 401 may, when making a decision in response to the update message of the mobile node 101, have the mobile node 101 use the advertisement service or decide any other operation to help it. This operation may be executed no matter whether the guide message is sent or not. The present invention is, for example, also applicable to the case where the network node 401 transfers any context to the mobile node 101.

The most practical and preferred embodiments of the present invention have been explained so far. It is easily understood by those skilled in the art that the detailed constitution and parameters like the constituting elements shown in FIG. 4 as the configuration of the guide manager 402 can be variously modified within the scope of the invention.

Note that the function blocks used in the explanation about the above-described embodiments of the present invention are typically embodied as LSI (Large Scale Integration). They may be independently formed as single chips or may be formed as one chip including a part or all of them. Note that LSI here may be called IC (Integrated Circuit), system LSI, super LSI or ultra LSI corresponding to the integration level.

The integration method is not limited to the LSI. These elements may be embodied as dedicated circuits or general-purpose processors. FPGA (Field Programmable Gate Array), that can be programmed after LSI fabrication or reconfigurable processor, for which the circuit cell connection or setting in the LSI can be reconfigured may be also used.

Furthermore, if any integration technology replacing the LSI is introduced in the course of progress of the semiconductor technology or by any other derivative technology, the function blocks may be naturally integrated using such technologies. For example, biotechnology may possibly be applied.

INDUSTRIAL APPLICABILITY

The present invention has an effect that, in case a mobile node can have communications with a plurality of different wireless networks, various services can be provided from the wireless networks to the mobile node that is not under their coverage without exhaustion of the mobile node battery. A plurality of different wireless networks include, for example, the third generation (3G) cellular network, general packet radio service (GPRS), IEEE802.11a/b/g, IEEE802.16a, Bluetooth® and WLAN (Wireless LAN). The mobile node may be, for example, cellular phone, laptops or PDAs (Personal Digital Assistants).

The invention claimed is:
1. A method for performing communication between a mobile node comprising means for communicating with at least first and second different wireless networks and each of network nodes of said first and second wireless networks, said method comprising the steps of:
sending a first message wishing communication with a network node of said second wireless network which is currently inaccessible, from said mobile node to a network node of said first wireless network currently accessible by said mobile node;
sending said first message with added distance information about a distance from the network node receiving said first message to the network node of said second wireless network, from the network node receiving said first message to nearby network nodes of said first and second wireless networks;

the network node of said second wireless network receiving the first message with the added distance information checking whether said distance information decreases from that of said first message previously received, and if it is judged that said mobile node is approaching when the distance information decreases sending a second message guiding communication with its network to nearby network nodes;

transferring said second message from the network node receiving said second message to the network node of said first wireless network accessible by said mobile node;

transferring said second message from the network node of said first wireless network receiving said second message to said mobile node; and presenting said second message to a user from said mobile node receiving said second message.

2. The method for communications according to claim 1, wherein said distance information is a hop count which is incremented every time a nearby network node of said first and second wireless network that transfers said first message makes a transfer; and the network node of said second wireless network receiving said first message checks whether said hop count decreases from that of said first message previously received and judges that said mobile node is approaching if the distance information decreases.

3. A system for performing communication between a mobile node comprising means for communicating with at least first and second different wireless networks and each of network nodes of said first and second wireless networks, said system comprising:

means for sending a first message wishing communication with a network node of said second wireless network which is currently inaccessible, from said mobile node to network nodes of said first wireless network currently accessible by said mobile node;

means for sending said first message with added distance information about a distance from the network node receiving said first message to the network node of said second wireless network, from the network node receiving said first message to nearby network nodes of said first and second wireless networks;

means for, by the network node of said second wireless network receiving the first message with the added distance information, checking whether said distance information decreases from that of said first message previously received, and if it is judged that said mobile node is approaching when the distance information decreases, sending a second message guiding communication with its network to nearby network nodes;

means for transferring said second message from the network node receiving said second message to the network node of said first wireless network accessible by said mobile node;

means for transferring said second message from the network node of said first wireless network receiving said second message to said mobile node; and means for presenting said second message to a user from said mobile node receiving said second message.

4. The system for communications according to claim 3, wherein said distance information is a hop count which is incremented every time a nearby network node of said first and second wireless networks that transfers said first message makes a transfer; and the network node of said second wireless network receiving said first message checks whether said hop count decreases from that of said first message previously received and judges that said mobile node is approaching if the distance information decreases.

5. A mobile node in a system for performing communication between a mobile node comprising means for communicating with at least first and second different wireless networks and each of network nodes of said first and the second wireless networks, said mobile node comprising:

means for sending a first message wishing communication with a network node of said second wireless network currently inaccessible to a network node of said first wireless network currently accessible; and means for receiving a second message and present it to a user, in case said first message with added distance information about a distance from the network node receiving said first message to the network node of said second wireless network is sent from the network node receiving said first message to nearby network nodes of said first and second wireless networks, the network node of said second wireless network receiving the first message with said added distance information checks whether said distance information decreases from that of said first message previously received, and if it is judged that said mobile node is approaching when the distance information decreases, sends a second message guiding communication with its network to nearby network nodes, corresponding to said second message, and said second message is transferred from the network node receiving said second message to the network node of said first wireless network accessible by said mobile node, and said second message is transferred from the network node of said first wireless network receiving said second message to said mobile node.

6. The mobile node according to claim 5, wherein said first message includes a field for setting a hop count which is incremented upon every transfer by a nearby network node of said first and second wireless network transferring said first message.

7. A network node in a system for communications between a mobile node comprising a means for communicating with at least first and second different wireless networks and each of network nodes of said first and second wireless networks, said firstly mentioned network node belonging to said first wireless network currently accessible by said mobile node and comprising:

means for receiving a first message and sending said first message with added distance information about a distance from the network node receiving said first message to the network node of said second wireless network to nearby network nodes of said first and second wireless networks, in case a first message wishing communication with a network node of said second wireless network currently inaccessible, corresponding to said first message, is sent from said mobile node to a network node of said first wireless network currently accessible by said mobile node;

means for receiving a second message and transferring it to the network node of said first wireless network accessible by said mobile node, in case the network node of said second wireless network receiving the first message with the added distance information checks whether said distance information decreases from that of said first message previously received, and if it is judged that said mobile node is approaching when the distance information decreases, sends a second message guiding communication with its network to nearby network nodes, corresponding to said second message; and means for receiving said second message and transfer it to said mobile node;

wherein said mobile node receiving said second message presents said second message to a user.

8. The network node according to claim 7, wherein said first message includes a field for setting a hop count which is incremented upon every transfer by a nearby network node of said first and second wireless networks transferring said first message.

9. A network node in a system for performing communication between a mobile node comprising means for communicating with at least first and second different wireless networks and each of network nodes of said first and second wireless networks, said firstly mentioned network node belonging to said second wireless network that is currently inaccessible and comprising:

means for receiving a first message with added distance information, checking whether said distance information decreases from that of said first message previously received, and if it is judged that said mobile node is approaching when the distance information decreases, sending a second message guiding communication with its network to nearby network nodes, in case a first message wishing communication with a network node of said second wireless network that is currently inaccessible is sent from said mobile node to a network node of said first wireless network currently accessible by said mobile node, and said first message with added distance information about a distance from the network node receiving said first message to the network node of said second wireless network, corresponding to said first message with added distance information, is sent from the network node receiving said first message to nearby network nodes of said first and second wireless networks;

wherein said second message is transferred from the network node receiving said second message to the network node of said first wireless network accessible by said mobile node, said second message is transferred from the network node of said first wireless network receiving said second message to said mobile node, and said mobile node receiving said second message presents said second message to a user.

10. The network node according to claim 9, wherein said first message includes a field for setting a hop count which incremented upon every transfer by a nearby network node of said first and second wireless network transferring said first message.

\* \* \* \* \*

UNITED STATES PATENT AND TRADEMARK OFFICE
CERTIFICATE OF CORRECTION

PATENT NO. : 8,027,322 B2
APPLICATION NO. : 12/281135
DATED : September 27, 2011
INVENTOR(S) : Keigo Asou et al.

It is certified that error appears in the above-identified patent and that said Letters Patent is hereby corrected as shown below:

Claim 1, column 13, line 6, incorrectly reads:

"approaching when the distance information decreases"

and should read:

"approaching when the distance information decreases,"

Signed and Sealed this
Twenty-seventh Day of March, 2012

David J. Kappos
*Director of the United States Patent and Trademark Office*